No. 776,858. PATENTED DEC. 6, 1904.
J. M. W. LONG.
DUPLEX SEEDING MACHINE.
APPLICATION FILED AUG. 19, 1904.
NO MODEL.

John M. W. Long
Inventor

Witnesses:
Elmer R. Shipley
G. E. Townsend by James W. See
Attorney

No. 776,858. Patented December 6, 1904.

UNITED STATES PATENT OFFICE.

JOHN M. W. LONG, OF HAMILTON, OHIO, ASSIGNOR TO THE LONG & ALLSTATTER COMPANY, OF HAMILTON, OHIO.

DUPLEX SEEDING-MACHINE.

SPECIFICATION forming part of Letters Patent No. 776,858, dated December 6, 1904.

Application filed August 19, 1904. Serial No. 221,313. (No model.)

*To all whom it may concern:*

Be it known that I, JOHN M. W. LONG, a citizen of the United States, residing at Hamilton, Butler county, Ohio, (post-office address Hamilton, Ohio,) have invented certain new and useful Improvements in Duplex Seeding-Machines, of which the following is a specification.

This invention pertains to a duplex seeding-machine composed of two members for parallel-row planting at adjustable width between rows, the individual members being capable of use separately.

My invention will be readily understood from the following description, taken in connection with the accompanying drawings, in which—

Figure 1:
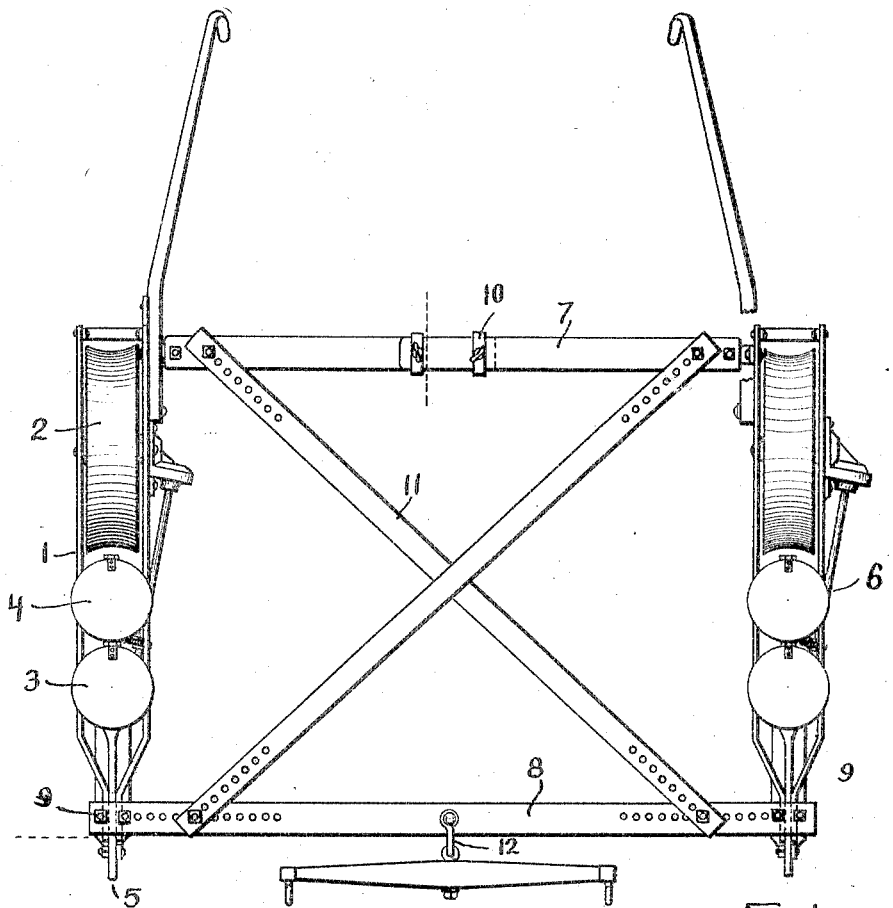
Figure 3:
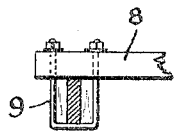
Figure 2:
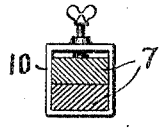

Figure 1 is a plan of a machine embodying my invention; Fig. 2, a transverse section of the rear connecting-bar; and Fig. 3 a transverse section at the forward end of one of the seeder-frames where the forward connecting-bar engages it.

In the drawings, 1 indicates a seeder considered as a whole; 2, its covering-wheel; 3, its seedbox; 4, its fertilizer-box; 5, the forward end of its frame, adapted to receive a hitching connection in a line of draft extending rearwardly through the transverse section of the covering-wheel; 6, a second seeder like the first one and arranged alongside of it at a distance apart corresponding with the desired distance between seed-rows; 7, a rear cross-bar extending from the rear portion of one seeder to the rear portion of the other and detachably connected to both seeders; 8, a corresponding front frame-bar connecting the forward ends of the frames of the two seeders; 9, a stirrup, one for each seeder, connecting the forward portion of the seeder-frame with the front connecting-bar, the front connecting-bar being provided with a series of holes for each stirrup, thus permitting of the seeders being secured to the connecting-bar at selective distance from each other; 10, clamps upon the rear connecting-bar, which bar is made in two relatively sliding sections, so that the effective length of the bar may be adjusted in correspondence with the adjustment made upon the front frame-bar; 11, diagonal braces crossing each other and secured to the connecting-bars to brace them, the bolts securing the braces to the connecting-bar being arranged for use in selective holes in the brace-bars to compensate for adjustments any distance between the seeders, and 12 a draft-hitch at the effective mid-point in the length of the forward connecting-bar and shown as being provided with a swingletree.

With the parts as shown in the drawings the line of draft is centrally between the two seeders. The adjustment of the effective length of the connecting-bars, along with an adjustment of the braces, permits of variations in the distance between the seeders without disturbance of the central location of the hitch-point 12.

By removing the connecting-bars and braces the individual seeders may be used separately and drawn upon from hitch-points passing rearwardly through the transverse center of their covering-wheels.

I claim as my invention—

A pair of seeders each comprising a covering-wheel and a front draft-hitch device in a line passing through the transverse center of the covering-wheel, an adjustable connecting-bar separably attached to the rear portion of each seeder, a coupling-bar separably attached to the front portion of each seeder, a pair of adjustable diagonal braces crossing each other and connecting the two connecting-bars, and a draft-hitch device at the effective center of length of the front connecting-bar.

JOHN M. W. LONG.

Witnesses:
J. W. SEE,
SAM D. FITTON, Jr.